United States Patent [19]

Greinke et al.

[11] Patent Number: 5,102,855

[45] Date of Patent: Apr. 7, 1992

[54] PROCESS FOR PRODUCING HIGH SURFACE AREA ACTIVATED CARBON

[75] Inventors: Ronald A. Greinke, Medina; Irwin C. Lewis, Strongsville; David R. Ball, Bay Village, all of Ohio

[73] Assignee: UCAR Carbon Technology Corporation, Danbury, Conn.

[21] Appl. No.: 554,810

[22] Filed: Jul. 20, 1990

[51] Int. Cl.$^5$ .................. C01B 31/12; B01J 20/20
[52] U.S. Cl. .................. 502/425; 502/424; 502/426; 502/437
[58] Field of Search .................. 502/423–426

[56] References Cited

U.S. PATENT DOCUMENTS

| | | | |
|---|---|---|---|
| 1,610,399 | 12/1926 | Urbain | 502/425 |
| 1,694,040 | 12/1928 | Ray et al. | 502/423 |
| 1,735,096 | 11/1929 | Urbain | 502/425 |
| 1,819,165 | 8/1931 | Hass | 502/425 |
| 3,305,315 | 2/1967 | Bacon et al. | 23/209.1 |
| 3,835,064 | 9/1974 | Shihomiya et al. | 502/425 |
| 3,969,268 | 7/1976 | Fukuda et al. | 502/425 |
| 4,259,092 | 3/1981 | Matsuo et al. | 55/78 |

*Primary Examiner*—Paul E. Konopka
*Attorney, Agent, or Firm*—Cornelius F. O'Brien

[57] ABSTRACT

Process for producing activated carbon, preferably high surface area activated carbon, from inexpensive cellulosic precursors, such as paper, by pretreating the cellulosic precursor with an activating agent, such as phosphoric acid, followed by carbonization in an inert atmosphere at an elevated temperature to produce activated carbon. The activated carbon can be further activated to increase its surface area by heating it in an oxidizing atmosphere at an elevated temperature to yield activated carbon having a surface area of at least 100 m$^2$/g.

10 Claims, No Drawings

PROCESS FOR PRODUCING HIGH SURFACE AREA ACTIVATED CARBON

FIELD OF THE INVENTION

The invention relates to a process for producing high surface area activated carbon from cellulosic precursors, such as newspapers and cotton linters, by pretreating the cellulosic precursors with an activating agent, such as phosphoric acid, followed by carbonization in an inert atmosphere at 450° C. to 1200° C. and then preferably activation in an oxidizing atmosphere, such as steam, at a temperature above 700° C.

BACKGROUND OF THE INVENTION

Activated carbon can be used for adsorption purposes, such as the extraction of gases or vapors from products, for adsorption of liquids and for solvent recovery in various applications. One process used in producing highly active gas adsorbent carbon consists of charring carbonaceous material, such as coconut shells, by application of heat and the further treatment of the carbon so produced with an oxidizing agent such as steam which slowly oxidizes the carbon.

U.S. Pat. No. 1,694,040 discloses a process for making dense strong activated charcoal by impregnating nut cellulose with a dehydrating agent, such as phosphoric acid or zinc chloride, heating the mixture to a temperature not materially below 350° C., leaching out the soluble components and then reheating the resulting carbon in an oxidizing atmosphere.

U.S. Pat. No. 1,819,165 discloses a process for producing highly active gas adsorbent carbon by impregnating carbonaceous material with phosphoric acid, then calcining said impregnated material in the absence of oxygen and then submitting the calcined product to controlled partial oxidation at temperatures above 700° C.

U.S. Pat. No. 3,305,314 discloses a process for producing permanently dehydrated heat treated material from a cellulosic textile material which comprises subjecting the cellulosic material to a controlled partial and selective decomposition of the cellulosic molecule by immersing the cellulosic material in an acid solution to wet the material therewith, removing the wet material from the solution, drying the material to remove the solvent therefrom and heat treating the dried material in an oxidizing atmosphere whereby decomposition involves a rupture of the carbon-oxygen and carbon-hydrogen bonds and the evolution of water, but falling just short of the scission of the main cellulose molecule, through the rupture of the carbon-carbon bonds with the evolution of hydrogen.

Although active carbon has been used extensively in gas and vapor adsorption devices, it is also well suited for the storage of gases such as methane. One of the best active carbons for the storage of methane is derived from chemical activation of coke. These carbons have very high surface areas (2500 to 3000 m$^2$/g) and are costly to produce.

It is an object of the present invention to provide a process for producing high surface area activated carbons preferably high surface activated carbons, from inexpensive cellulosic precursors.

It is another object of the present invention to produce activated carbons, preferably high surface area activated carbons, that can be utilized in storage containers to more efficiently store gases such as methane, hydrogen and acetylene.

It is another object of the present invention to provide a process for producing activated carbons, preferably high surface area activated carbons from paper, paper based products and cotton linters.

It is another object of the present invention to provide a process for producing high surface area activated carbon that is cost effective to produce and easy to make.

SUMMARY OF THE INVENTION

The invention relates to a process for producing activated carbon which comprises the steps:

a) treating a cellulosic precursor with at least one activating agent selected from the group consisting of phosphoric acid, sulfuric acid, boric acid, zinc chloride, ammonium chloride, ammonium phosphate, phosphate esters and phosphate salts; and b) heating the treated cellulosic precursor of step a) at a temperature from 450° C. to 1200° C. in an inert atmosphere to produce an activated carbon.

To increase the surface area of the activated carbon, the following step can be added:

c) heating the carbonized material of step b) at a temperature in excess of 700° C in an oxidizing atmosphere to produce activated carbon preferably having a surface area of at least 600 m$^2$/g.

As used herein, cellulosic precursor shall mean natural cellulosic forms such as cotton, linen, jute, wood pulp, straw, etc. and regenerated cellulosic forms such as rayon. Preferably the cellulosic precursors are paper and cotton linters with paper, preferably comprising in excess of 90% cellulose, being the most preferred.

In step a) of the treatment, the cellulosic precursor, such as paper, is contacted with a liquid activating agent, such as a solution of phosphoric acid or ammonium phosphate, to stabilize the carbon framework of the cellulose so carbon is not lost during subsequent heat treatment.

In the preferred embodiment, the cellulosic precursor, such as paper, is contacted with a phosphate, which acts as the activating agent. The preferred phosphate is phosphoric acid or ammonium phosphate (mono-basic or dibasic) and the phosphate could be added to the paper in at least three ways.

(1) The paper can be dipped into a dilute solution of phosphoric acid or ammonium phosphate, and the slurry can then be evaporated to dryness by heating between 100° and 150° C.

(2) The paper can be dipped into a dilute solution of phosphoric acid or ammonium phosphate and the excess solution can be removed by filtering and squeezing the excess water from the newspaper. The phosphate treated newspaper can then be dried by heating between 100° to 150° C.

(3) Concentrated phosphoric acid (or ammonium phosphate) can be sprayed uniformly on the newspaper and then the newspaper can be directly carbonized without an evaporation step.

The preferred amount of phosphoric acid (85%) added to the newspaper using any of the above three methods is between 3 and 20 pph based on the weight of the newspaper. The most preferred level would be about 7 to 10 pph of 85% phosphoric acid. The same equivalent amount of elemental phosphorus in the form of ammonium phosphate can also be used. For example, if dibasic ammonium phosphate, $(NH_4)_2HPO_4$, is employed, the preferred amount would be between 3.5 and 23 pph based on the weight of the newspaper. The most preferred level would be about 8.0 to 11.5 pph. The preferred method of addition of the activating agent would be spraying it on the newspaper in a concentrated form. This method is economical since evaporation is not required and the paper can be immediately carbonized. The amount of time that the newspaper can be in contact with the phosphate is small, less than one minute, since the desirable reaction of phosphate with the newspaper is fast. In one preferred method, one can spray between 5 and 34 pph, based on the weight of the paper, of a 50% phosphoric acid solution. The sample can be carbonized directly without an evaporation step. If dibasic ammonium phosphate is used in the spraying technique, the preferred amount is between 7 and 46 pph of a 50% solution of dibasic ammonium phosphate.

The treatment of the cellulosic precursor, such as paper, with the activating agent prior to carbonization has been discovered to substantially increase the yield of the carbon in step b) of the process. In excess of 60%, preferably in excess of 70%, most preferably in excess of 80% of the theoretical carbon yield can be obtained by using this pretreatment step a) of the process. Additionally, the derived carbon from step b) is believed to develop a preponderance of micropores (less than 30A) which when subjected to an oxidizing treatment as in step c, will produce high surface activated carbon that is ideally suited for storage of gases, such as methane, hydrogen or acetylene. This favorable microporosity is believed to result from the cellulose structure which contains a polymeric backbone with many functional groups. The carbonization of the cellulose leaves a micropore structure through elimination of these groups which can then be accessible to the oxidizing activation treatment in step c) if employed to produce a high surface area activated carbon.

The carbonization treatment in step b) is carried out in any inert atmosphere, such as nitrogen or argon, at a temperature from 450° C. to 1200° C., preferably from 500° C. to 1000° C. and more preferably from 600° C. to 1000° C. In this step, the cellulosic precursor is carbonized and, as stated above, the pretreatment of the cellulosic precursor as recited in step a) will result in a greater carbon yield and can produce an activated carbon having a surface area of about 500 $m^2/g$. In the carbonization treatment step, the heating should be maintained for a sufficient period of time to assure proper carbonization. Generally a time period of at least 10 minutes could be sufficient with a time period of 10 minutes to 5 hours being preferred and a time period of 15 minutes to 2 hours being most preferred. The time period is dependent on the temperature of the treatment with the higher temperature requiring a shorter time period and thus for optimum results, an appropriate heat treatment temperature and time period can be selected.

The carbon material produced in step b) can then be further activated, if desired, in an oxidizing atmosphere for a time period at an elevated temperature sufficient to produce activated carbon having a surface area of at least 600 $m^2/g$, preferably at least 1000 $m^2/g$ and most preferably greater than 1300 $m^2/g$. Preferably, this treatment of the carbon material can be performed by maintaining the carbon at a temperature above 700° C., and preferably above 800° C. while in contact with an oxidizing environment, such as steam, to preferably burn off at least 30% of the carbon. Generally, a time period of from 5 minutes to 5 hours would be sufficient.

Although the preferred activation step c) would be carried out using steam, it could be carried out with $CO_2$, air, mixtures of $CO_2$ with steam and/or air as well as other physical and chemical activation procedures which are known in the art.

The high surface area activated carbon produced is ideally suited for use in containers that can be used to store gases such as methane, hydrogen and acetylene. The activated carbon could be mixed with a suitable binder, such as a sugar based material, to form rigid objects which can be utilized to fabricate various shape and size articles. Due to the relatively high surface area of the activated carbon produced, a container using this carbon material can adsorb a high volume of gas, i.e. methane, per volume of carbon. Although this type of high surface area activated carbon is ideally suited for use in gas storage containers, it also will be ideally suited for use in devices for adsorbing gases and vapors such as purifiers, deodorizers, dechlorinators, detoxicators and the like.

EXAMPLE 1

100 g of shredded newspaper was treated in a tray with a solution of 1.9 g of ammonium phosphate in 1000 ml of water. The tray was placed on a hot plate at 110° C. to remove the excess water and dry the shredded newspaper. The dried newspaper was then heated in a nitrogen atmosphere, from room temperature to 1000° C. over a period of 4 hours and held at 1000° C. for about 0.5 hours. A carbon yield of 21.5% was obtained having a surface area of 500 $m^2/g$.

EXAMPLE 2

A solution of 300 ml of water and 3 g of 85% phosphoric acid was prepared together. Then, 30 g of cotton linters were added and mixed for 30 minutes. The fibers were removed from the liquid and the excess liquid was squeezed from the fibers (200 ml of liquid recovered). The fibers were dried on a hot plate and were then carbonized in a nitrogen atmosphere at 500° C. for 2 hours. The carbon yield was 30.6% and the carbonized material contained 1.46% phosphorus (X-ray analysis). The material was activated in a rotating furnace with a 16 cubic inch activating chamber at 850° C. for 10 hours with steam. The steam environment was generated by passing 2.5 cubic feet of argon per hour through water at 0° C. An activated carbon with a yield of 25.4%, a phosphorus content of 4.7% and a surface area of 1742 $m^2/g$ was obtained. The overall yield of activated carbon was 7.8% as based on the starting weight of the cotton linters.

EXAMPLE 3

A solution of 300 ml of water and 6 g of 85% phosphoric acid was prepared. Then, 30 g of cotton linters were added and mixed for 1.0 hour. The fibers were squeezed to remove the excess solution (200 ml of the solution was recovered). The fibers were dried in an oven at 120° C. and were then carbonized at 500° C. in a nitrogen atmosphere for 2 hours. A carbon yield of 26.5% was obtained and the product contained 4.75% phosphorus. The material was activated in a rotating furnace with a 16 cubic inch activating chamber at 850° C. for 10 hours with steam. The steam environment was generated by passing 2.5 cubic feet of argon per hour through water at 0° C. An activated carbon with a yield of 25.0%, a phosphorus content of 5.96%, and a surface area of 1669 $m^2/g$ was obtained. The overall yield of activated carbon was 6.63% as based on the starting weight of the cotton linters.

EXAMPLE 4

15 g of cotton linters were placed in a beaker and mixed for about 0.5 hour with a solution of 0.70 g of 85% phosphoric acid and 250 ml of water. The water was evaporated from the linters on a hot plate. The treated fibers were carbonized at 500° C. for 2 hours in a nitrogen atmosphere. A carbon yield of 26.4% was obtained. The carbonized material was then activated in a rotating furnace with a 16 cubic inch activating chamber at 850° C. for 4 hours with steam. The steam environment was generated by passing 2.5 cubic feet of argon per hour through water at 0° C. An activated carbon with a surface area of 1813 $m^2/g$ and yield of 37.3% was obtained. The overall yield of activated carbon was 9.9% as based on the initial weight of the cotton linters.

EXAMPLE 5 (Comparative Example)

An activated carbon was made from cotton linters without phosphoric acid. 46.9 g of raw cotton linters were carbonized at 750° C. in a furnace with a nitrogen atmosphere. A yield of only 20.0% was obtained. The material was activated in a rotating furnace with a 16 cubic inch activating chamber at 825° C. for 2 hours with steam. The steam environment was generated by passing 2.5 cubic feet of argon per hour through water at 22° C. An activated carbon with a yield of 51% was obtained. The overall yield of activated carbon was 10.2% similar to example 4, but the surface area was only 1176 $m^2/g$. The results of this test show that when phosphoric acid was not used, the activated carbon surface area obtained was lower than when the cotton linters were pretreated with the phosphoric acid (Example 4).

EXAMPLE 6 (Comparative Example)

An activated carbon was made without phosphoric acid. The cotton linters were carbonized at 800° C. for 1.5 hours in a nitrogen atmosphere. A carbon with a yield of only 19.3% was obtained. The material was activated in a rotating furnace with a 16 cubic inch activating chamber at 750° C. for 13.0 hours with steam. The steam environment was generated by passing 2.5 cubic feet of argon per hour through water at 22° C. An activated carbon with a yield of 43.4% and a surface area of 885 $m^2/g$ was obtained. The overall yield of activated carbon was 8.3% as based on the initial weight of the cotton linters.

EXAMPLE 7 (Comparative Example)

An activated carbon was made without phosphoric acid. The cotton linters were carbonized at 800° C. for 1.5 hours in a nitrogen atmosphere. A carbon with a yield of only 19.3% was obtained. The material was activated in a rotating furnace with a 16 cubic inch activating chamber at 750° C. for 20.0 hours with steam. The steam environment was generated by passing 2.5 cubic feet of argon per hour through water at 22° C. An activated carbon with a yield of 19.9% and a surface area of 732 $m^2/g$ was obtained. The overall yield of activated carbon was 3.8% as based on the initial weight of the cotton linters.

EXAMPLE 8

A solution of 1.5 g of 85% phosphoric acid in 300 ml of water was prepared. 30 g of shredded newspaper were added and mixed for 1.0 hour. The paper was filtered to remove the excess liquid (150 ml of liquid were retained on the paper). The paper was then dried on a hot plate and carbonized at 500° C. for 2 hours in a nitrogen atmosphere. A carbon with a yield of 31.2% was obtained. The material was activated in a rotating furnace with a 16 cubic inch activating chamber at 850° C. for 5.0 hours with steam. The steam environment was generated by passing 2.5 cubic feet of argon per hour through water at 22° C. An activated carbon with a yield of 39.3%, a phosphorus content of 2.30% and a surface area of 1516 $m^2/g$ was obtained. The overall yield of activated carbon was 12.0% as based on the starting weight of the newspapers.

EXAMPLE 9

30.1 g of shredded newspaper were placed in a tray. A solution of 1.5 g of ammonium phosphate dissolved in 300 ml of water was added. The tray was placed on a hot plate to dry. The dried paper was heated to 270° C. in air for 10 minutes and then the carrier gas was switched to nitrogen. The material was carbonized at 500° C. for 2 hours. A carbon with a yield of 35.8% was obtained. The carbon was activated in a rotating furnace with a 16 cubic inch activating chamber at 850° C. for 4.5 hours with steam. The steam environment was generated by passing 2.5 cubic feet of argon per hour through water at 22° C. An activated carbon with a yield of 32.9%, a phosphorus content of 2.89% and a surface area of 1661 $m^2/g$ was obtained. The overall yield of activated carbon was 11.8% as based on the starting weight of the newspapers.

EXAMPLE 10 (Comparative Example)

30 g of shredded newspapers were placed in a furnace and carbonized at 500° C. for 2 hours in a nitrogen atmosphere. The carbonization yield was only 23.9%. The material was activated in steam at 850° C. for 4.0 hours in a rotating furnace with a 16 cubic inch activating chamber. The steam environment was generated by passing 2.5 cubic feet of argon per hour through water at 22° C. An activated carbon with a yield of 19.9% and a surface area of 1260 $m^2/g$ was obtained. The overall yield of activated carbon was 4.8% as based on the starting weight of the newspapers. The results of this test show that when the paper was not pretreated with phosphoric acid, the yield of carbon and the activated carbon surface area were lower.

EXAMPLE 11

A solution of 1.4 g of 85% phosphoric acid and 300 ml of water was added to 30 g of a conventional paper towel material in a dish and the slurry was mixed for 1 hour. The slurry was evaporated to dryness on a hot plate. The dried material was carbonized at 500 C. for 3 hours in a nitrogen atmosphere. A carbonization yield of 32.7% was obtained. The carbonized material was steam activated in a rotating furnace with a 16 cubic inch activating chamber at 850° C. for 5.0 hours. The steam environment was generated by passing 2.5 cubic feet of argon per hour through water at 0° C. An activated carbon with a yield of 44.1%, a phosphorus content of 0.97%, and a surface area of 1597 $m^2/g$ was obtained. The overall yield of activated carbon was 14.4% as based on the starting weight of the paper.

EXAMPLE 12

A solution of approximately 50% phosphoric acid was prepared by mixing 180 g of phosphoric acid (85%) and 120 ml of water. The solution was placed in an atomizer bottle. 30.0 g of shredded newspapers were placed in a tray and the acid solution was sprayed over the paper from the atomizer while mixing until 6.0 g [3.5 g of phosphoric acid (85%)]had been added. The paper, mixed for another 5 minutes, appeared to be dry and no visible wet spots were evident. The sample was carbonized at 600° C. in a nitrogen atmosphere for 2 hours. The carbonization yield was 36.3%. The carbon was activated in a rotating furnace with a 16 cubic inch activating chamber at 850° C. for 6.0 hours with steam. The steam environment was generated by passing 2.5 cubic feet of argon per hour through water at 22° C. An activated carbon with a yield of 30.6%, a phosphorus content of 2.56% and a surface area of 1797 m²/g was obtained. The overall yield of the activated carbon was 11.1% as based on the starting weight of the newspapers.

EXAMPLE 13

100 g of shredded newspapers were placed in a dish and then a solution of 10 g of phosphoric acid (85%) and 100 ml of water was poured over the newspaper. The slurry was stirred until the newspapers were saturated. The slurry was then dried on a hot plate. The dried treated paper was carbonized at 600° C. for several hours in a nitrogen atmosphere. The carbonized yield was 39.9%. The carbon was activated in a rotating furnace with a 16 cubic inch activating chamber at 950° C. for 45 minutes with steam. The steam environment was generated by passing 2.5 cubic feet of argon per hour of nitrogen through water at 75° C. An activated carbon with a yield of 25.2%, a phosphorus content of 2.88%, and a surface area of 1902 m²/g was obtained. The overall yield of the activated carbon was 10.1% as based on the initial weight of the newspapers.

To evaluate the effectiveness of high surface active carbon for gas storage applications, the effective storage was calculated using the definition of effective storage as the storage of gas at high pressure of 500 psig minus the storage of gas at a low pressure of one atmosphere, psig. This value would represent the amount of deliverable gas to an engine or other receiving means. The effective storage is calculated using the loading ratio correlation equation assuming that the active carbon can be compacted to a density of 0.85 g/cc or about 53 lb/ft³.

The loading ratio correlation (LRC) equation was used to evaluate methane loading of the active carbon of several of the above examples. The LRC adsorption isotherm equation is:

$$\frac{L}{L_o} = \frac{(K \times P)^{1/n}}{[1 + (K \times P)^{1/n}]}$$

where
L is the loading (milli-moles/g) at a given pressure, P, of methane,
L$_o$ is the maximum capacity of the active carbon adsorbent,
K is the interaction coefficient and is a constant for a given temperature and carbon,
n is a coefficient that measures the deviation from Langmuir behavior (LRC is based on the Langmuir adsorption isotherm in which n=1). The coefficient is a constant for a given carbon at a given temperature.

The LRC equation is for a single adsorbate, such as methane, at a constant temperature of 25° C. The loading of methane at 500 psig on the carbon was measured gravimetrically using the conventional McBain sorption balance technique.

For Example 4 in which the surface area of the activated carbon was 1813 m²/g, the methane loading at 500 psi was found to be 7.71 milli-moles/g and the effective storage was calculated to be 5.9 lb/ft³.

For Example 8 in which the surface area of the activated carbon was 1516 m²/g, the methane loading at 500 psi was found to be 6.75 milli-moles/g.

For Example 9 in which the surface area of the activated carbon was 1661 m²/g, the methane loading at 500 psi was found to be 7.15 milli-moles/g.

Although the methane was fed into the container at 500 psig, the methane could be stored in the container at a lower pressure of from 1 psig up to and exceeding 500 psig.

Although the present invention has been described with reference to particular details, it is not intended that these details shall be construed as limiting the scope of the invention.

What is claimed:

1. A process for producing activated carbon which comprises the steps:
   a) treating paper with at least one activating agent selected from the group consisting of phosphoric acid and ammonium phosphate, with the proviso that if phosphoric acid is used the amount of phosphoric acid is from 3 to 20 pph based on the weight of the paper and if ammonium phosphate is used the amount of ammonium phosphate is from 3.5 to 23 pph based on the weight of the paper;
   b) heating the treated paper of step a) at a temperature from 450° C. to 1200° C. in an inert atmosphere for a time period sufficient to produce an activated carbon material; and
   c) heating the activated carbon material of step b) at a temperature in excess of 700° C. in an oxidizing atmosphere for a time period sufficient to produce activated carbon having a surface area of at least 1000 m²/g.

2. The process of claim 1 wherein in step a) the activating agent is phosphoric acid.

3. The process of claim 2 wherein the phosphoric acid is sprayed onto the cellulosic precursor.

4. The process of claim 2 wherein the phosphoric acid is in an aqueous solution and before step b) is performed, the paper is dried to substantially remove the water.

5. The process of claim 1 wherein in step a) the activating agent is phosphoric acid; in step b) the temperature is from 450° C. to 1200° C. for a period of from 10 minutes to 5 hours; and in step c) the oxidizing atmosphere is steam.

6. The process of claim 5 wherein in step b) the temperature is from 500° C. to 1000° C. for a period of from 15 minutes to 2 hours; and in step c) the temperature is at least 700° C. for a period of time sufficient to form activated carbon.

7. The process of claim 1 wherein in step c) the activated carbon has a surface area of at least 1300 m$^2$/g.

8. The process of claim 1 wherein in step c) the oxidizing atmosphere contains at least one oxygen-containing component selected from the group consisting of $CO_2$, air, steam and mixtures thereof.

9. The process of claim 1 wherein the activating agent is phosphoric acid; in step b) the temperature is from 450° C. to 1000° C. for a period of time from 15 minutes to 5 hours; and in step c) the oxidizing atmosphere is steam.

10. The process of claim 9 wherein in step c) the activated carbon produced has a surface area of at least 1300 m$^2$/g.

* * * * *

UNITED STATES PATENT AND TRADEMARK OFFICE
CERTIFICATE OF CORRECTION

PATENT NO. : 5,102,855
DATED : April 7, 1992
INVENTOR(S) : R. A. Greinke et al It is certified that error appears in the above-identified patent and that said Letters Patent is hereby corrected as shown below:

Title Page:
In the ABSTRACT at the last line "100" should read
-- 1000 --.

Signed and Sealed this

Sixth Day of July, 1993

Attest:

MICHAEL K. KIRK

Attesting Officer     Acting Commissioner of Patents and Trademarks